United States Patent [19]

Sabo et al.

[11] Patent Number: 4,906,159
[45] Date of Patent: Mar. 6, 1990

[54] FREELY POSITIONABLE LOAD CARRYING ATTACHMENT FOR AN AUTOMATIC GUIDED VEHICLE

[75] Inventors: Joseph F. Sabo, Lyndhurst; Andrew P. Blau, Richmond Heights; John E. Wible, Painesville, all of Ohio

[73] Assignee: Caterpillar Industrial Inc., Mentor, Ohio

[21] Appl. No.: 327,315

[22] Filed: Mar. 22, 1989

[51] Int. Cl.⁴ .............................................. B65G 57/28
[52] U.S. Cl. ................................. 414/608; 414/273; 414/641
[58] Field of Search ............... 414/608, 641, 548, 663, 414/672, 273, 275; 212/151, 152; 187/9 R, 9 E

[56] References Cited

U.S. PATENT DOCUMENTS

| | | | |
|---|---|---|---|
| 3,734,327 | 5/1973 | Ellis, Jr. | 414/641 |
| 4,354,794 | 10/1982 | Macnab | 414/607 |
| 4,520,443 | 5/1985 | Yuki et al. | 414/273 |
| 4,640,657 | 2/1987 | Moore et al. | 414/672 |
| 4,647,784 | 3/1987 | Stephens | 250/561 |
| 4,751,983 | 6/1988 | Leskovec et al. | 187/9 R |

Primary Examiner—Sherman D. Basinger
Assistant Examiner—Edwin L. Swinehart
Attorney, Agent, or Firm—Alan J. Hickman

[57] ABSTRACT

A load carrying attachment has a supporting frame mounted on an elevationally movable carriage assembly mounted uprights of a lift mast and a load engaging frame having a load engaging device. A connecting device connects the load engaging frame to the supporting frame and guides the load engaging frame for movement in a preselected plane in directions transverse the uprights. The load engaging frame is freely transversely movable in the plane in response to an external force being applied to the load engaging frame and alleviates damage to the load engaging frame or a carried load due to misalignment with a transporter. A sensing device is provided for sensing the position of the load engaging frame and delivering a vehicle braking signal in response to the load engaging frame being at either a first or a second preselected transverse position. The load carrying attachment is particularly suited for use on an automatic guided vehicle.

16 Claims, 5 Drawing Sheets

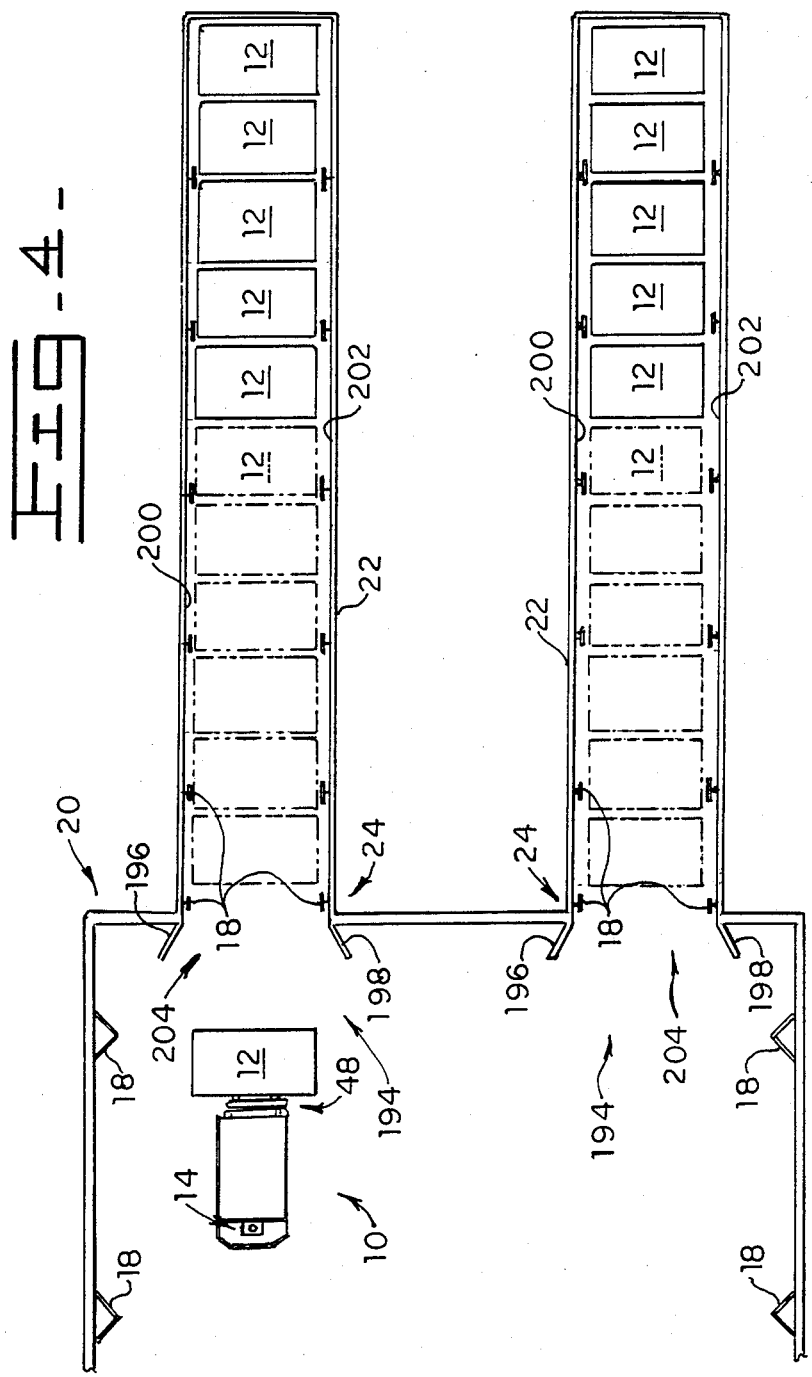

FREELY POSITIONABLE LOAD CARRYING ATTACHMENT FOR AN AUTOMATIC GUIDED VEHICLE

TECHNICAL FIELD

This invention relates to a load carrying attachment having a load engaging frame which is freely movable in response to the application of an external force and more particularly to an automatic guided vehicle having a load engaging frame which is freely transversely moveable for centering a load carried thereon relative to a docked load carrying transporter carrier in response to an external force being applied to the load.

BACKGROUND ART

Material handling vehicles and particularly automatic guided material handling vehicles have been utilized for decades to transport loads between spaced apart locations within storage, manufacturing and assembly facilities without the need for a vehicle operator. These vehicles were typically equipped with guidance systems which followed paths defined by stripes, wires, and other types of markers located on the floor. In order for the vehicle to be able to successfully follow the marked path, the floor must be smooth and free from imperfections such as, bumps, pot holes, and other obstructions. The need for the high quality floor and fixed guide path restricted the automatic guided vehicle usage to relatively simple transportation applications in new or remodeled facilities.

Advancements made in the area of computer technology during the last decade has provided for revolutionary changes in automatic guided vehicle technology in both the areas of vehicle guidance and load manipulation. An example of a guidance system for a new generation of automatic guided vehicles is shown in U.S. Pat. No. 4,647,784 to Philip E. Stephens dated Mar. 3, 1987 wherein a laser scanner mounted on the vehicle reads bar coded targets located within the facility and delivers this information to a computer located on the vehicle. The on-board computer calculates the location of the vehicle using triangulation, compares this information to a dead reckoning position of the vehicle and makes vehicle steering corrections when necessary. Dead reckoning of the vehicle is achieved by computer monitoring of vehicle sensors which sense wheel rotation, steering angle position and the like. As a result of this advancement in navigation the need for floor markings and smooth floors has been eliminated and the ability to travel to locations external of the facility for acquiring and depositing loads has been made possible.

In most material handling applications loads are placed on and removed from load carrying transporters such as, trailers, vans and the like docked at a receiving dock of the facility by manually driven fork lift trucks and the like. To load or unload a docked transporter by an automatic guided vehicle has been impossible in the past. However, with the birth of the free-ranging automatic guided vehicle discussed above the ability to load and unload a transporter is achievable.

In order to load and unload a load carrying transporter with an automatic guided vehicle the position of the docked transporter must be within an acceptable tolerance range from a nominal docking location so that the load may be moved relative to the load carrying transporter without damage to the load, the automatic guided vehicle and associated lift mast assembly, and load carrying transporter. Damage may occur when forceable contact between the load and side(s) of the docked transporter take place.

In situations where the automatic guided vehicle has deviated from a preprogrammed guide path or has become skewed relative to the load carrying vehicle, contact between the load and the sides of the load carrying transporter may take place which may cause damage as discussed above. The force caused by contact in either of the aforementioned situation may cause the vehicle to slide which will change the actual position of the vehicle and affect subsequent accuracy of vehicle navigation.

The lift mast assembly which carries the load is often at an angle relative to the vertical during the loading, traveling, and depositing process. The forces of gravity as well as vehicle dynamics acting on the load tend to move the load relative to the lift mast assembly. This affects the known position of the load and ultimately the deposit location. In situations wherein the attitude of the lift mast is forwardly inclined there is the potential for the load to inadvertently slide off the load engaging device carried on the lift mast assembly.

The present invention is directed to overcoming one or more of the problems as set forth above.

DISCLOSURE OF THE INVENTION

In one aspect of the present invention, a freely positionable load carrying attachment for an automatic guided vehicle having a frame and, a lift mast having spaced apart substantially parallel uprights mounted on the frame is provided. A carriage assembly is mounted on the spaced apart uprights and elevationally movable along the uprights between elevationally spaced apart locations. A supporting frame is connected to the carriage assembly and extends elevationally from the carriage assembly. A load engaging frame has a load engaging device which extends in a direction substantially normal to the direction of elevationally movement of the carriage assembly. A connecting device is provided for pivotally connecting the load engaging frame to the supporting frame and guiding the load engaging frame for movement in a preselected plane in directions transverse the uprights. The load engaging frame is freely transversely movable in the plane in response to an external force being applied to the frame. The connecting device maintains the frame at a preselected attitude during transverse movement in the plane.

A material handling arrangement is provided for automatically moving loads from a stored location in a facility to a shipping position located on a load carrying transporter located at a docked location in the facility. An automatic guided vehicle having a frame is adapted to traverse an underlying surface in response to preprogrammed instructions. A lift mast having spaced apart substantially parallel upright is mounted on the vehicle frame. A carriage assembly is mounted on the spaced apart uprights and elevationally movable along the uprights between elevationally spaced apart locations. A supporting frame is connected to the carriage assembly and extends elevationally from the carriage assembly. A load engaging frame having at least one load engaging device extends in a direction substantially normal to the direction of elevationally movement of the carriage assembly. A connecting device pivotally connects the load engaging frame to the supporting frame and guides the load engaging frame for movement in a preselected plane in directions transverse the uprights. The load engaging frame is freely transversely movable in the plane. A guide device is provided for forcibly urging the load carried on the load engaging device to transversely move the load engaging frame and position the load relative to the docked location of the transporter in response to the automatic guided vehicle being movable toward the transporter.

Because the load engaging frame, upon which the load is carried, is freely movable in directions transverse the uprights damage to the automatic guided vehicle, the transporter and associated componentry is eliminated. This is due to the fact that any interference between the load and the vertical sides of the transporter caused by travel of the vehicle will result in free movement of the load relative to the vehicle. Because the load is freely movable in the plane transverse the uprights, the load is self centering relative to the transporter so that a predetermined amount of deviation in the position of the vehicle relative to the transporter is accommodated.

Should an excessive amount of transverse movement of the load engaging frame occur, a sensing device will identify this condition and deliver a control signal which will result in the termination of further travel of the vehicle which would be detrimental to the vehicle, associated componentry and the transporter.

The guide device which forcibly urges the load carried on the load engaging device in the transverse direction aligns the load with the transporter so that the load will not snag the transporter and so that the load will become aligned to fit within the sides of the transporter.

The load engaging device retains the load from sliding motion so that the load may be accurately deposited at the desired location. Even in situations wherein the uprights are tilted the load position will remain a preselected distance from the load engaging frame.

BRIEF DESCRIPTION OF THE DRAWINGS

FIG. 4 is a diagrammatic top plan view of a facility showing docked transporters and an automatic guided vehicle carrying a load;

BEST MODE FOR CARRYING OUT THE INVENTION

Figure 1:
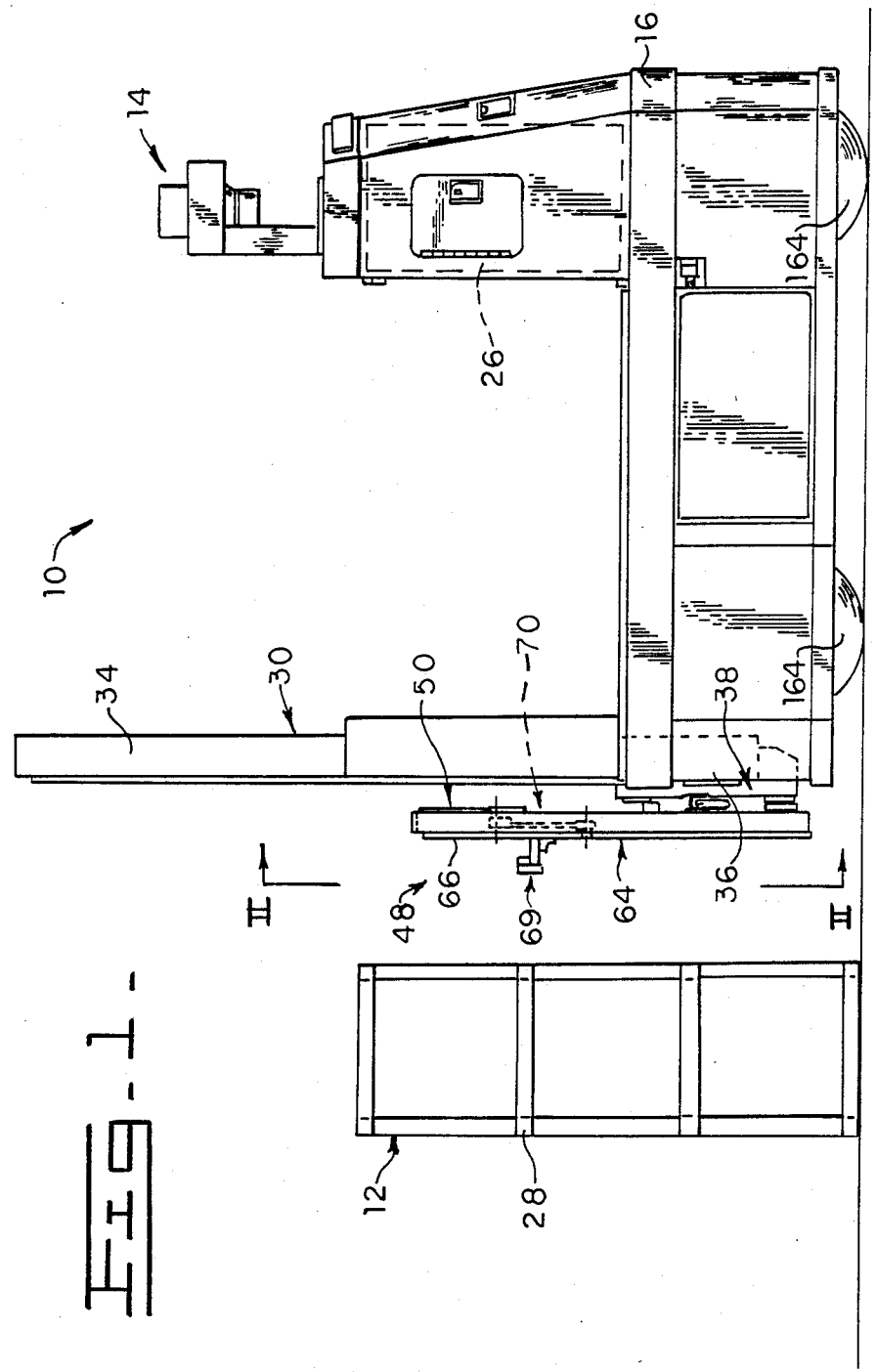
FIG. 1 is a diagrammatic side elevational view of an embodiment of the present invention showing an automatic guided vehicle positioned to pick up a load to be lifted.

With reference to the drawings and particularly FIGS. 1 and 4, an automatic guided vehicle 10 of preferably the driverless free-ranging type is shown adjacent a load 12 to be lifted and to be transported to a remote location. The automatic guided vehicle 10 has a laser scanner 14 mounted on the vehicle frame 16 which reads bar coded targets 18 located at spaced apart locations within the facility 20 and at spaced apart locations within load carrying transporters 22 docked at loading docks 24 of the facility 20. The load carrying transporters 22 discussed herein include trailers, vans, and the like. The automatic guided vehicle 10 has an on board computer 26 which receives information from the laser scanner 14 and wheel rotation and steering angle sensors (not shown) and controls travel of the vehicle 10 based on preprogrammed instructions and triangulation calculations using target location information and sensor information. Since such an automatic guided vehicle is well known by those in the field further discussion related to vehicle navigation will be omitted. It is to be noted that other types of guidance systems which do not require wires, stripes and other types of floor markings are suitable substitutes for the laser guidance system discussed above and within the scope of this invention.

The load 12 to be placed on or removed from the transporters 22 is shown as a having tubular frame 28 having compartments for supporting an assortment of items, for example, vehicle seats (not shown).

A lift mast 30 having a pair of spaced apart uprights 32,34 is mounted on the vehicle frame 16 at an end 36 thereof. A carriage assembly 38 of conventional construction is mounted on the spaced apart first and second uprights 32,34 and elevationally movable therealong between elevationally spaced apart locations. A hydraulic lift jack and chain and sheave arrangement (all not shown) moves the carriage assembly between the elevationally spaced apart locations along the uprights 32,34 in a conventional manner. Since such an arrangement is extremely well known in the art further discussion will be eliminated.

Figure 3:
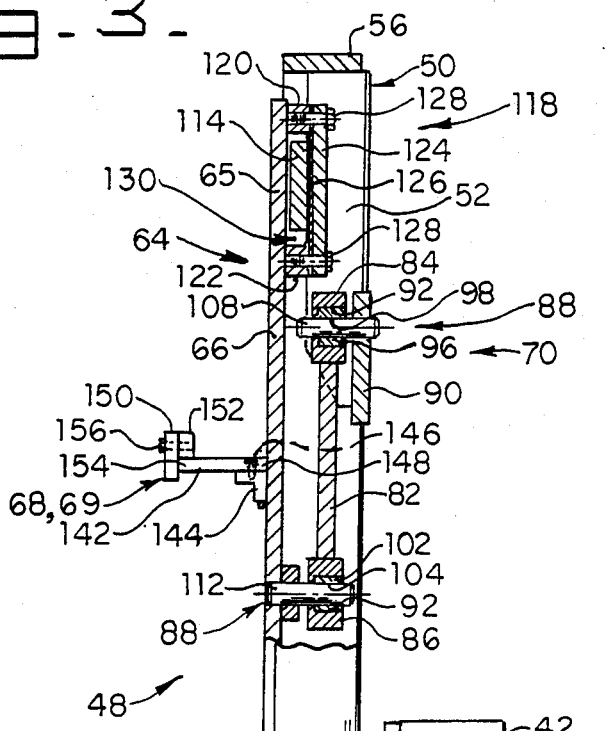
FIG. 3 is a view taken along lines III—III of FIG. 1 with portions broken away.

As best seen in FIG. 3, the carriage assembly 38 has a pair of spaced apart roller brackets 40 (only one roller bracket is shown) each having spaced apart rollers 42 rotatively connected thereto. The rollers are rollingly engaged in the respectively adjacent upright of the first and second uprights 32,34. It should be noted that although only a single pair of uprights 32,34 has been described additional pairs of uprights may be sequentially nested within said uprights 32,34 and elevationally movable along uprights 32,34 to provide further elevational extension and additional lift height. Should additional uprights be provided the carriage assembly 38 would be rollingly engaged with the innermost pair of movable uprights. The Carriage assembly 38 has upper and lower carriage plates 44,46 which are connected to the roller brackets 40 at elevationally spaced apart locations on the roller brackets 40 such as by welding. The carriage plates 44,46 maintain the spaced apart roller brackets 40 at the preselected spaced distance and provide for mounting of a load carrying attachment 48.

Figure 2:
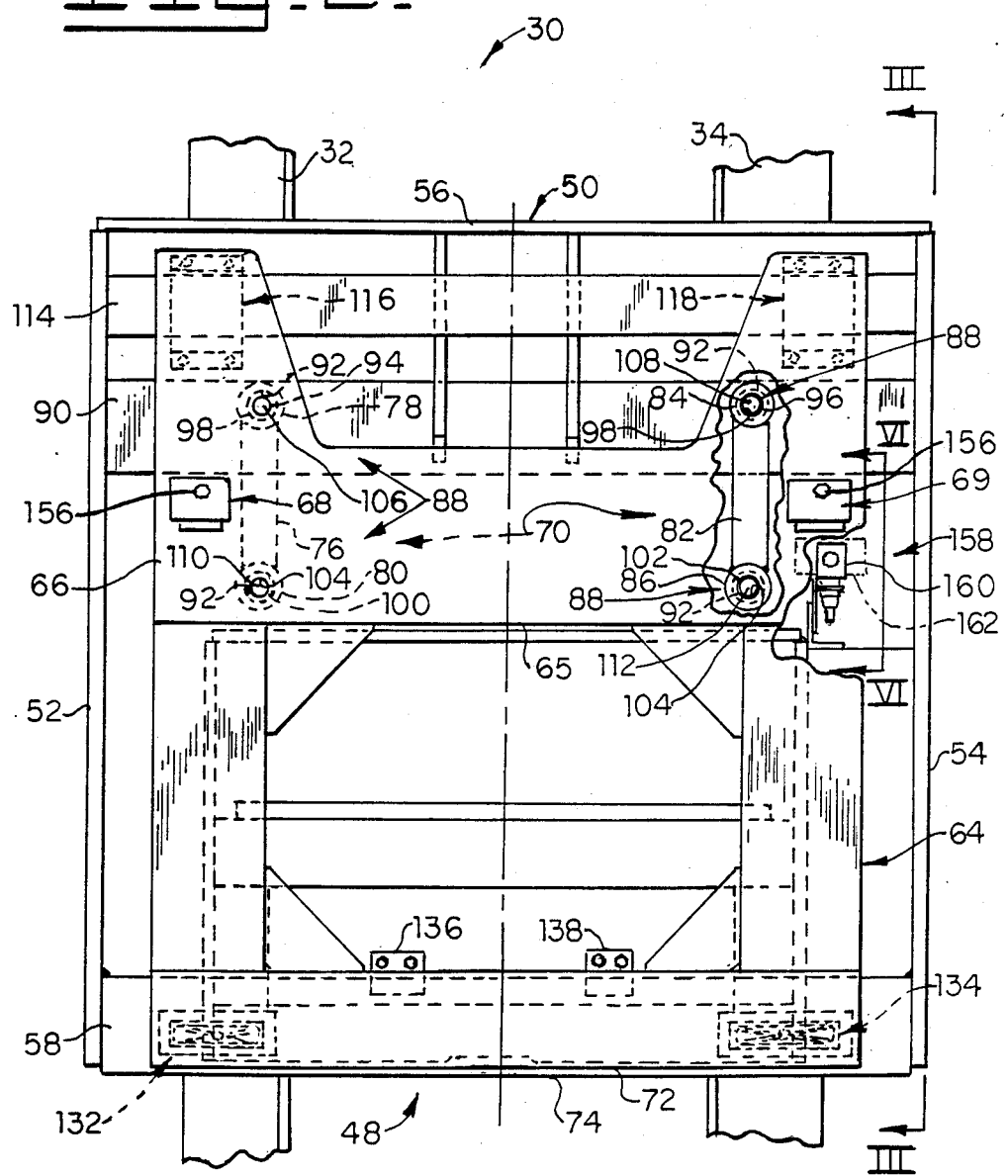
FIG. 2 is a view taken along lines II—II of FIG. 1 showing a supporting frame, a load engaging frame and a connecting means in substantial detail.

As best seen in FIGS. 2 and 3, the load carrying attachment 48 includes a supporting frame 50 which has first and second spaced apart sides 52,54 and upper and lower spaced apart supporting frame plates 56,58 connected to and between the first and second sides 52,54 and forming a rigid rectangular supporting frame 50. The supporting frame has an upper hooking portion 60 which hangs the supporting frame 50 on the upper carriage plate 44 and a lower hooking portion 62 which engages the lower carriage carriage plate 46 and retains the upper hooking portion 60 from inadvertent disconnection from the upper carriage plate 44. The supporting frame 50 extends elevationally from the carriage assembly 38 and preferably substantially parallel to the uprights 32,34.

A load engaging frame 64 has a flat plate member 65 defining a surface plane 66. First and second load engaging devices 68,69 are connected at transversely spaced apart locations on the plate member 65. A means 70 is provided for pivotally connecting the load engaging frame 64 to the supporting frame 50 and guiding the load engaging frame 64 for movement in the preselected plane 66 in directions transverse the pair of uprights 32,34. The load engaging devices 68 each extend in a direction substantially normal to the direction of elevational movement of the carriage assembly 38 and are preferably perpendicular in part to the planar surface 66. The connecting means 70 allows for free transverse movement of the load engaging frame 64 in the plane 66 in response to an external force being applied to the the frame in the transverse direction. The connecting means 70 also maintains the load engaging frame 64 at a preselected attitude during transverse movement in said plane 66 so that a bottom edge 72 of the load engaging frame 64 remains substantially parallel to a bottom edge 74 of the lower supporting frame plate 58.

The connecting means 70 includes a first elongate link 76 having first and second spaced apart end portions 78,80 and a second elongate link 82 having first and second spaced apart end portions 84,86. A means 88 is provided for pivotally connecting the first end portions 78,84 of the first and second links 76,82 to a crossmember 90 of the supporting frame 50 at preselected transversely spaced apart locations on the crossmember 90 and for pivotally connecting the second end portions 80,86 of the first and second links 76,82 to the plate member at preselected transversely spaced apart locations on the plate member 65. The crossmember 90 is connected at opposite ends thereof to the first and second sides 52,54 of the supporting frame 50 in any suitable manner. The first and second links 76,82 are substantially parallel to each other and the load engaging frame 64 is transversely centered relative to the supporting frame 50 when no external forces are applied to the load 12 or load engaging frame 64 and the load engaging frame is free to hang under the influence of gravity.

The first and second links 76,82 each have an aperture 92 disposed in the first and second end portions 78,80,84,86 of the first and second links 76,82. The link pivotal connecting means 88 includes first and second bushings 94,96 each having a bore 98. The first bushing 94 is disposed in the aperture 92 at the first end portion 78 of the first link 76 and the second bushing 94 is disposed in the aperture 92 at the first end portion 84 of the second link 82. Similarly, the link connecting means 88 includes third and fourth bushings 100,102 each having a bore 104. The third bushing 100 is disposed in the aperture 92 at the second end portion 80 of the first link 76 and the fourth bushing 102 is disposed in the aperture 92 at the second end portion 86 of the second link 82. The link pivotal connecting means 88 also has first and second shafts 106,108 connected to the crossmember 90 at the aforementioned preselected transversely spaced apart locations on the cross member 90. The first shaft 106 is disposed in the bore 98 of the first bushing 94 and the second shaft 108 is disposed in the bore 98 of the second bushing 96. The link pivotal connecting means 88 also has third and fourth shafts 110,112 connected in any suitable manner to the plate member 65 at preselected transversely spaced apart locations on the plate member 65. The third shaft 110 is disposed in the bore 98 of the third bushing 100 and the fourth shaft 112 is disposed in the bore 98 of the fourth bushing 102. Retainers such as snap rings and other suitable devices (not shown) are provided to retain the links 76,82 on the shafts 106,108,110,112 in any conventional manner.

As best seen in FIGS. 2 and 3, connecting means 70 has an elongate guide bar 114 which is connected to and between the first and second sides 52,54 of the supporting frame 50. The guide bar 114 is preferably rectangular in crossection and oriented parallel to the plane 66 and parallel to the bottom edge 74. As a result of the above construction and orientation, the guide bar 114 is transverse relative to the uprights 32,34. The guide bar 114 is disposed in first and second guide cages 116,118 secured at spaced apart locations to the plate member 65 of the load engaging frame 64. The guide cages 116,118 are identical in construction and include first an second elevationally spaced apart flanges 120,122, a retaining member 124, and a bearing 126. The spaced apart flanges 120,122 straddle the guide bar 114 and the retaining member 124 is connected to the flanges 120,122 by a plurality of threaded fasteners 128. The bearing 126 which is rectangular in configuration and constructed of any suitable antifriction material, is disposed between the retaining member 124 and the guide bar 114 and permits relatively friction free movement of the load engaging frame 64 in the plane 66. The retaining member 124 maintains the load engaging frame 64 for movement only in the plane 66 and resists cocking, twisting and other undesirable movements of the load engaging frame 64. It is to be noted that the guide bar is smaller in crossection than the opening 130 defined by the guide cages 116, 118 so that the load engaging frame 64 may freely swing about the first and second links 76,82 without binding. Excessive swinging of the load engaging frame 64, however, will be stopped by the guide cages 116,118.

In order to insure free transverse movement of the load engaging frame 64 relative to the supporting frame 50 an additional pair of antifriction bearings 132,134 of any suitable material are disposed between the load engaging frame 64 and the supporting frame 50. In particular bearings 132,134 are connected at spaced apart locations to either of the load engaging or supporting frames 64,50 at locations near the bottom edges 72,74 and engage the other of the load engaging and supporting frames 64,50. A pair of retainers 136,138 maintains the load engaging frame 64 from excessive separation from the supporting frame 50. The retainers 136,138 are mounted on the load engaging frame 64 and have a hooking finger 140 which engages the supporting frame 50 when a preselected amount of separation motion occurs.

The load engaging devices 68,69 are identical in construction and each include an elongate load engaging member 142 which is mounted on the plate member 65 by an angle bracket 144. In particular the bracket 144 is affixed to the plate member 65 such as by welding and the load engaging member 142 is attached to the bracket 144 such as by threaded fasteners 146 at a first end portion 148 of the load engaging member 142. An elevationally extending hooking member 150 is connected to a second end portion 154 of the load engaging member 142 such as by welding. A spacer member 152 which is adjustable through shimming is attached to the hooking member 150 by a threaded fastener 156 and establishes a preselected distance from the plane 66 defined by plate 65 of the of the load engaging frame 64. The hooking member 150 and particularly the spacer member 152 maintains the tubular frame 28 on the load engaging member 142 between the load engaging frame 64 and the hooking member 150 and prevents inadvertent disconnection therefrom and movement relative thereto in situations when the mast uprights 32,34 are tilted relative to the vertical.

Figure 6:
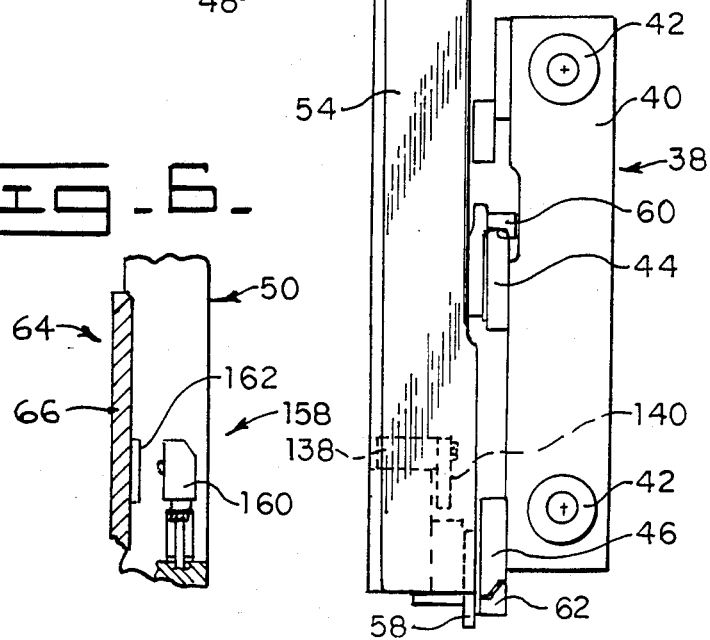
FIG. 6 is a cross-sectional view taken along lines VI—VI of FIG. 2.

Referring to FIGS. 2 and 6, a means 158 is provided for sensing the transverse position of the load engaging frame 64 in said plane 66 relative to the supporting frame 50 and deliver a control signal in response to the load engaging frame 64 being at one of a first and a second preselected transverse position. In particular the first and second positions are established as the maximum allowable amount of swinging motion of the load engaging frame 64 on the first and second links 76,82 that can be accommodated by the automatic guided vehicle without adversely affecting load deposit and acquisition. The sensing means 158 includes a sensor 160 which is mounted on the support frame 50 by any suitable bracket and is adapted to deliver electromagnetic radiation, receive a reflection of the delivered electromagnetic radiation, and deliver a control signal preferably in the absence of receiving the electromagnetic radiation. The delivered control signal may simply be a change in the electrical state of the sensor 160, such as from (+) to (−) or vice versa. The sensing means 158 also includes a reflective member 162 Which is mounted at a preselected location on the load engaging frame 64 at which electromagnetic radiation delivered from the sensor 160 is reflected back toward the sensor 160 while the load engaging frame 64 is located between the first and second positions. Thus, when the load engaging frame 64 is at either of the first or second positions or is moved to locations past either of the first or second positions electromagnetic radiation delivered from sensor 160 will not be reflected back. The reflective member is preferably retroreflective and secured to the plate member 65.

Figure 5:
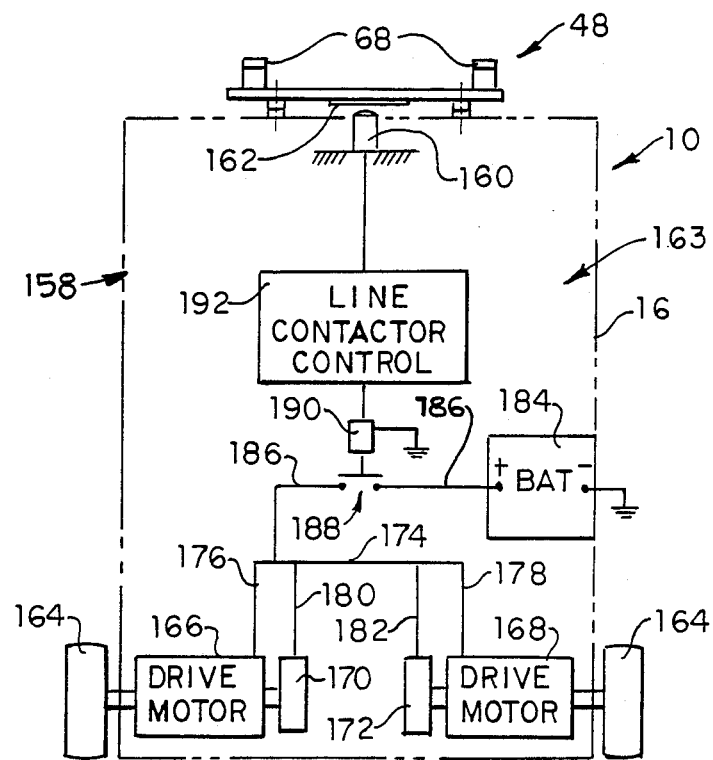
FIG. 5 is a schematic representation of a portion of the automatic guided vehicle control system.

With reference to FIG. 5, a means 163 is provided for receiving the control signal delivered from the sensing means 153 and stopping movement of the vehicle 10. The automatic guided vehicle 10 has a plurality of ground engaging wheels 164 rotatively mounted on the vehicle frame 16 and first and second drive motors 166,168 mounted on the vehicle frame 16. The first drive motor 16 is drivingly connected to one of the wheels 164 and the second drive motor 168 is drivingly connected to another of said wheels 164. A first spring applied electrically released brake 170 of conventional design is connected to the first drive motor 166 and a second spring applied electrically released brake 172 is connected to the second drive motor 168. It is to be noted that the brakes 170,172 could have been connected directly to the wheels 164 without departing from the spirit of the invention. The first and second drive motors 166,168 and first and second brakes 170,172 are each connected to a buss 174 by branch conductors 176,178,180,182, respectively. The buss 174 is connected to a source of electrical energy 184, such as a battery, by conductor 186.

The receiving means 163 further includes a line contactor 188 disposed in conductor 186, between the source 184 and the buss 174 and is moveable between an open position at which electrical energy is blocked from the source 184 to the buss 174 and a closed position at which electrical energy is delivered from the source 184 to the buss 174. Whenever electrical energy is available at the buss 174 electrical energy is provided to the first and second drive motors and brakes 166,168,170,172. The line contactor 188 has a solenoid 190 which is responsive to electrical energy to move the contactor 188 between the open and closed positions. A line contactor control 192 is connected to and between the sensor 160 and solenoid 190 and receives the control signal from the sensor 160. A line contactor control 192, in response to receiving the control signal from the sensor 160, activates the solenoid 190 which in turn moves the contactor 188 from the closed position to the open position. As a result power from the source 184 to the drive motors 166,168 is blocked which disables powered operation of the drive motors 166,168. At the same time electrical energy is blocked from the brakes 170,172 which results in application thereof and stopping of the vehicle 10.

A means 194 is provided for forcibly urging a load 12 carried on the load engaging device 68,69 to transversely move the load engaging frame 64 and position the load 12 relative to the docked location of one of the transporters 22 in response to the automatic guided vehicle 10 traveling toward the docked transporter 22. The urging means 194 includes first and second spaced apart elevationally oriented ramps 196,198 which are elevationally aligned with first and second elevationally oriented spaced apart sides 200,202 of the transporters 22. The ramps 196,198 are substantially flat plates which increase in an opening dimension as they extend from the loading dock 24 into the facility and away from the transporter 22. The ramps 196,198 are preferably secured to the facility 20 at a location adjacent an opening 204 of the loading dock 24. It is to be noted that an alternate construction would be to attach the first and second ramps 196,198 to the first and second sides of the transporter 22.

INDUSTRIAL APPLICABILITY

With reference to the drawings, a material handling arrangement for automatically moving loads between a stored location within the facility and a shipping location on a docked load carrying transporter 22 is accomplished through the use of the automatic guided vehicle 10. The automatic guided vehicle 10 utilizes the preprogrammed instructions within its computer 26, the laser scanner 14, and onboard dead-reckoning system to enable entry onto the transporter 22 for removal and deposit of loads 12. Due to the number of variables, such as the position of the transporter, the space available for navigation, the accuracy of position of the load 12 deposited by a manually driven fork truck and the like, error in load positioning may occur which will affect the operation and manipulation abilities of the automatic guided vehicle 10.

In operation, the automatic guided vehicle 10 approaches a load 12 to be picked up at a stored location within the facility 20. Based on preprogrammed instructions the vehicle 10 knows the location of the load 12 and positions itself adjacent the load 12 to be transported. The carriage assembly 38 being at a lowered position is elevated until the first and second load engaging devices 68,69 engage the tubular frame 28 of the load 12 and lift the load to a suitable preprogrammed travel height. The automatic guided vehicle 10 then travels from the stored location (not shown) of the load 12 toward the loading dock 24. This travel is accomplished as previously discussed, through preprogrammed instructions, dead-reckoning, and the reading of targets 18 by the laser scanner 14. As the vehicle 10 approaches the opening 204 it maneuvers to a centered location relative to the transporter 22 so that it may guide itself onto the transporter 22. Since the actual location of the vehicle 10 and the transporter 22 may vary from the nominal desired location there is the potential that the load 12 may snag or otherwise interfere with the transporter sides 200,202 during travel of the vehicle 10 onto the transporter 22. This is particularly prevalent in situations wherein the width of the load 12 is only slightly smaller than the distance between the sides of the transporter 22, such as in situations wherein the tubular frame 28 is being loaded.

The connecting means 70 serves to alleviate this problem of interference by allowing the load engaging frame 64 to move transversely relative to the direction of movement of the vehicle 10 and the uprights 32,34 in response to an external force of being applied to either the load 12, the load engaging frame 64 or the load engaging devices 68,69. It is to be noted that only the component of force in the transverse direction (parallel to the plane 66) will cause the desired movement. This external force results from contact between either of the transporter sides 200,202 and the load 12, load engaging frame 64 or the load engaging devices 68,69. As a result the load engaging frame 64 and the load 12 carried thereon will move away from the contacted transporter side 200,202 and permit deposit at a preprogrammed location within the transporter 22.

It should be recognized that the first and second guide cages 116,118 and the guide bar 114, the first and second antifriction bearings 132, and the first and second retainers 136,138 all serve to maintain the load engaging frame 64 in the plane 66 and assist in providing free transverse movement of the load engaging frame 64 and the load 12 carried thereon.

As the automatic guided vehicle 10 approaches the transporter 22, the first and second angled vertical ramps 196,198 at the dock opening 204 funnels the load 12 by gently urging the load 12 transversely as the vehicle 10 enters the transporter when contact between the load 12 and either of the first and second ramps 196,198 occurs. This will accommodate a moderate amount of error in alignment and adjust the position of the load relative to the sides 200,202 of the transporter. Should the amount of transverse movement of the load engaging frame 64 be great enough to place the load engaging frame 64 at either of the aforementioned first or second transverse positions, the sensing means 158 will deliver a signal to the receiving means 163 which will result in stopping of the vehicle 10. Thus, an excessive amount of transverse load engaging frame 64 movement indicates a significant error in positioning and one that needs to be investigated by a qualified system operator.

Once the vehicle 10 is at the proper location on the transporter 22 the computer 26 will instruct the lift mast 30 to lower and deposit the load 12. The position at which the load 12 is to be deposited resides in the memory of the computer 26 and the position of the vehicle 10 is verified through triangulation of the targets 18 on the transporter 22.

The first and second load engaging devices 68,69 hook and retain the tubular frame 28 from sliding off when the uprights are at a forward inclined position. The hooking member 150 and spacer 152 insure the proper spacing for the tubular frame 28, based on the crossectional tube thickness, and retains the tubular frame 28 on the load engaging member 142 when the lift mast 30 is inclined. Once the load 12 is deposited in the transporter 22 and the carriage assembly 38 is lowered until the load engaging devices 68,69 are free to clear the frame 28, the vehicle is driven from the transporter 22 to the storage area where a second load 12 is to be acquired. The sequence for unloading a transporter 22 is substantially a reverse of the aforementioned loading sequence and therefore will not be discussed in any greater detail.

Other aspects, objects and advantages of the present invention can be obtained from a study of the drawings, the disclosure and the appended claims.

We claim:

1. A freely positionable load carrying attachment for an automatic guided vehicle having a frame and a lift mast mounted on the frame, said lift mast having spaced apart substantially parallel uprights, comprising:

a carriage assembly mounted on the spaced apart uprights and elevationally movable along said uprights between elevationally spaced apart locations;

a supporting frame connected to the carriage assembly and extending elevationally from the carriage assembly;

a load engaging frame having at least one load engaging device extending in a direction substantially normal to the direction of elevational movement of the carriage assembly; and means for connecting the load engaging frame to the supporting frame and guiding the load engaging frame for pivoting movement in a preselected plane in directions transverse the uprights, said load engaging frame being freely transversely movable in said plane in response to an external force being applied to the frame, and said connecting means maintaining said frame at a preselected attitude during transverse movement in said plane.

2. A freely positionable load carrying attachment, as set forth in claim 1, wherein said supporting frame has a cross member and said load engaging frame has a plate member, said connecting means including:

a first and second elongate links each having first and second end portions; and means for pivotally connecting the first end portion of each of the first and second links to the cross member at preselected transversely spaced apart locations on the cross member and for pivotally connecting the second portion of each of the first and second links to the plate member at preselected transversely spaced apart locations on the plate member.

3. A freely positionable load carrying attachment, as set forth in claim 2, wherein said first and second links each have an aperture disposed in the first and second end portions and said connecting means includes:

first and second bushings each having a bore and being disposed in the apertures at the first end portion of the first and second links;

third and fourth bushings each having a bore and being disposed in the apertures at the second end portion of the first and second links;

first and second shafts connected to said cross member at said preselected transversely spaced apart locations on the cross member and being disposed in the bore of the first and second bushings; and third and fourth shafts connected to said plate member at said preselected transversely spaced apart locations on the plate member and being disposed in the bore of the third and fourth bushings.

4. A freely positionable load carrying attachment, as set forth in claim 2, wherein said connecting means includes:
an elongate guide bar connected to the supporting frame, extending parallel to said plane, and in said transverse direction relative to the uprights;
a guide cage having a retaining member and being mounted on said plate member, said retaining member being engaged with the elongate guide bar and maintaining said load engaging frame in said plane.

5. A freely positionable load carrying attachment, as set forth in claim 1, including:
means for sensing the position of the load engaging frame and delivering a control signal in response to the load engaging frame being at one of a first and a second preselected spaced apart position in said plane;
means for receiving said control signal and stopping movement of the vehicle.

6. A freely positionable load carrying attachment, as set forth in claim 5, including:
a plurality of ground engaging wheels rotatively mounted on the vehicle frame;
a source of electrical energy mounted on the vehicle frame, said receiving means including;
an electrically controlled brake mechanism connected to at least one of said ground engaging wheels;
a line contactor movable between a closed position at which electrical energy is delivered from said battery to said electrically controlled brake mechanism and an open position at which said electrical energy is blocked from said brake mechanism;
a line contactor control connected to said line contactor and said electrically controlled brake mechanism, said line contactor control moving said line contactor between said open and closed positions in response to receiving said control signal from said sensing means.

7. A freely positionable load carrying attachment, as set forth in claim 6, wherein said brake mechanism is applied and said wheel is restrained from rotation in response to said line contactor being open.

8. A freely positionable load carrying attachment, as set forth in claim 7, including:
a drive motor connected to at least one of said wheels and said line contactor, said line contactor preventing the delivery of electrical energy to the drive motor at said line contactor open position.

9. A freely positionable load carrying attachment, as set forth in claim 5, wherein said sensing means includes:
a sensor mounted on one of the support and load engaging frames and adapted to deliver electromagnetic radiation and receive a reflection of said electromagnetic radiation, said sensor delivering said control signal in the absence of receiving said electromagnetic reflection; and
a reflective member mounted on the other of the support and load engaging frames and being adapted to reflect electromagnetic radiation toward said sensor in response to the load engaging frame being located between said first and second positions, said reflective member being free from reflecting said electromagnetic radiation toward said sensor in response to the load engaging frame being at said first and second positions, said sensor delivering said control signal in the absence of receiving said reflected electromagnetic radiation.

10. A freely positionable load carrying attachment, as set forth in claim 1 wherein said load has a frame and wherein said load engaging device has a load engaging member and an elevationally extending hooking member mounted on the load engaging member at a preselected location spaced from the load engaging frame, said hooking member maintaining said load frame on the load engaging member between the load engaging frame and the hooking member.

11. A material handling arrangement for automatically moving loads from a stored location in a facility to a shipping position located on a load carrying transporter located at a docked location relative to the facility, comprising:
an automatic guided vehicle having a frame and being adapted to traverse an underlying surface in response to preprogrammed instructions;
a lift mast having spaced apart substantially parallel uprights and being mounted on the vehicle frame;
a carriage assembly mounted on the spaced apart uprights and elevationally movable along said uprights between elevationally spaced apart locations;
a supporting frame connected to the carriage assembly and extending elevationally from the carriage assembly;
a load engaging frame having at least one load engaging device extending in a direction substantially normal to the direction of elevationally movement of the carriage assembly;
means for pivotally connecting the load engaging frame to the supporting frame and guiding the load engaging frame for movement in a preselected plane in directions transverse the uprights, said load engaging frame being freely transversely movable in said plane;
means for guidably forcibly urging a load carried on the load engaging device to transversely move the load engaging frame and position the load relative to the docked location of the transporter in response to the automatic guided vehicle traveling toward the transporter.

12. A material handling arrangement, as set forth in claim 11 wherein said load carrying transporter has first and second spaced apart elevationally oriented sides and said forceable urging means includes first and second spaced apart elevationally oriented ramps elevationally aligned with said first and second spaced apart elevationally oriented sides, respectively.

13. A material handling arrangement, as set forth in claim 12, wherein said first and second ramps are connected to said facility.

14. A material handling arrangement, as set forth in claim 11, wherein said automatic guided vehicle includes;
means for sensing the position of the load engaging frame and delivering a control signal in response to the load engaging frame being at one of a first and a second preselected spaced apart position in said plane;
means for receiving said control signal and stopping powered movement of the vehicle.

15. A material handling arrangement, as set forth in claim 14, includes a plurality of ground engaging wheels rotatively mounted on said frame and wherein said receiving means includes:

a electrically released brake mounted on said vehicle frame and operatively connected to one of said wheels;

a line contactor connected to and between a source of electrical energy and said electrically released brake, said line contactor being moveable between and open position at which electrical energy from said source is blocked from said electrically released brakes and a closed position at which said electric energy from said source is passed to said electrically released brakes;

a line contactor control connected between said line contactor and said sensing means and being adapted to move said line contactor from said closed position to said open position in response to said receiving said control signal, said brake being applied at the open position of the contactor.

16. A material handling arrangement, as set forth in claim 14, includes a plurality of ground engaging wheels rotatively mounted on said frame and wherein said receiving means includes:

an electric drive motor mounted on said vehicle and connected to one of said wheels;

a line contactor connected to and between a source of electrical energy and said drive motor, said line contactor being moveable between and open position at which electrical energy from said source is blocked from said drive motor and a closed position at which said electric energy from said source is passed to said drive motor;

a line contactor control connected between said line contactor and said sensing means and being adapted to move said line contactor from said closed position to said open position in response to receiving said control signal and disabling powered operation of said drive motor.

* * * * *